United States Patent
Yocom et al.

(10) Patent No.: US 6,419,854 B1
(45) Date of Patent: *Jul. 16, 2002

(54) LONG PERSISTENCE RED PHOSPHORS AND METHOD OF MAKING

(75) Inventors: Perry Niel Yocom, Princeton; Diane Zaremba, Fairless Hills, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/477,307

(22) Filed: Jan. 4, 2000

Related U.S. Application Data

(63) Continuation-in-part of application No. 09/098,221, filed on Jun. 16, 1998, now Pat. No. 6,071,432.

(51) Int. Cl.[7] .......................... C09K 11/56; C09K 11/55
(52) U.S. Cl. .................. 252/301.45; 428/403; 428/404; 428/407
(58) Field of Search ..................... 252/361.45; 428/403, 428/404, 407

(56) References Cited

U.S. PATENT DOCUMENTS

| | | | |
|---|---|---|---|
| 2,979,467 A | 4/1961 | Keller | 252/301.4 S |
| 4,705,952 A | 11/1987 | Lindmayer | 250/434.1 |
| 4,725,344 A | 2/1988 | Yocom et al. | 204/192.15 |
| 4,755,324 A | 7/1988 | Lindmayer | 252/301.4 S |
| 4,857,228 A | 8/1989 | Kabay et al. | 252/301.4 S |
| 4,877,994 A * | 10/1989 | Fuyama et al. | 252/301.4 S |
| 5,043,096 A | 8/1991 | Lindmayer | 252/301.4 S |
| 5,650,094 A | 7/1997 | Royce et al. | 252/301.4 S |
| 5,958,591 A * | 9/1999 | Budd | 428/403 |
| 6,071,432 A * | 6/2000 | Yocom et al. | 252/301.4 R |

FOREIGN PATENT DOCUMENTS

| | | | |
|---|---|---|---|
| WO | WO 00/56836 | 9/2000 | C09K/11/56 |

* cited by examiner

*Primary Examiner*—C. Melissa Koslow
(74) *Attorney, Agent, or Firm*—William J. Burke

(57) ABSTRACT

Long persistence phosphors based on strontium sulfide and activated with a divalent rare earth such as europium and a trivalent rare earth that does not change valence in a strontium sulfide host, and including oxygen and a halide, have long persistence and emit in the red-to-orange colors of the spectrum.

29 Claims, 1 Drawing Sheet

LONG PERSISTENCE RED PHOSPHORS AND METHOD OF MAKING

This application is a continuation-in-part of application Ser. No. 09/098,221 filed Jun. 16, 1998, now U.S. Pat. No. 6,071,432.

This application relates to long persistence red emitting phosphors and their preparation. More particularly, this invention relates to strontium sulfide based phosphors activated with a divalent rare earth and a trivalent rare earth that does not change valence in the strontium sulfide host.

BACKGROUND OF THE INVENTION

Long persistence phosphors that emit in the green, blue-green and blue colorations have been known for some time. They include zinc sulfide-based and strontium aluminate-based phosphors activated with rare earths.

However, orange and red hued long persistence phosphors have been disclosed only recently, and they have several serious drawbacks in use. For example, Royce et al discloses in U.S. Pat. No. 5,650,094 rare earth activated divalent titanate phosphors, such as $CaTiO_3$ and $Ca-Zn-Mg-TiO_3$, but their emission is visible only for a few minutes. Lindmayer, in U.S. Pat. No. 5,043,096, reported a strontium sulfide based phosphor doped with three rare earths in the form of their oxides and fluxed with a halide, such as LiF. However, the fired fluoride phosphor was highly sintered and had to be ground to obtain a useful powdered material. However, grinding degrades the emission, and thus the phosphor must be heated or annealed to repair the crystal defect damage. However, the emission performance is never fully restored. These phosphors are described as being useful as additives to paint formulations.

The above phosphors are different from stimulable phosphors. Stimulable phosphors, when exposed to ultraviolet or visible light, only weakly or poorly luminesce, and when the light source is removed, the luminescence ceases. However, when the phosphor is later exposed to infrared light, which can be hours or months later, the phosphor emits a strong burst of light. Thus these phosphors store the original light energy and thus are known as storage-type phosphors. Such phosphors are disclosed by Keller for example in U.S. Pat. No. 2,979,467, by Kabay et al in U.S. Pat. No. 4,857,228 and by Lindmayer in U.S. Pat. No. 4,705,952. These phosphors are characterized by being doped by a rare earth that changes its valence, such as samarium or bismuth, among others. This behavior is quite different from the long persistence phosphors described herein which, after exposure to light, continue to luminesce after the light source has been removed. Such phosphors do not exhibit storage effects.

Long persistence phosphors that emit in the orange to red are highly desirable because they are easy to see in the dark, particularly in the event of a power failure for example. They are highly useful for "EXIT" signs in a darkened theater, to mark fire fighting equipment, to make visible other safety devices and breathing masks, fire axes and the like. Safety devices and signs such as the above have long used red colors, and thus they are familiar. In addition, for decorative or novelty uses, such as for toys, automobile hub caps, sporting goods and the like, red and orange are also very desirable bright colors.

Thus a red-orange-emitting, long persistence phosphor has long been sought.

SUMMARY OF THE INVENTION

We have found that strontium sulfide (SrS) activated with divalent europium and co-activated with a trivalent rare earth that does not change valence in the SrS host, and including a halide and oxygen, forms long lasting, red and orange phosphors after firing. The present solid, sintered phosphors can be molded directly into a desired shape during firing, or, if mixed with alumina powder, can form a phosphor powder directly. Alternatively, a SrS:Eu phosphor doped with a trivalent rare earth ion that does not change valence in the SrS host, can be fired in sulfur vapor contacted to or passed over a carbon source to produce a $CS_2$ atmosphere. This method also forms a phosphor powder directly.

DETAILED DESCRIPTION OF THE INVENTION

Figure 1A:
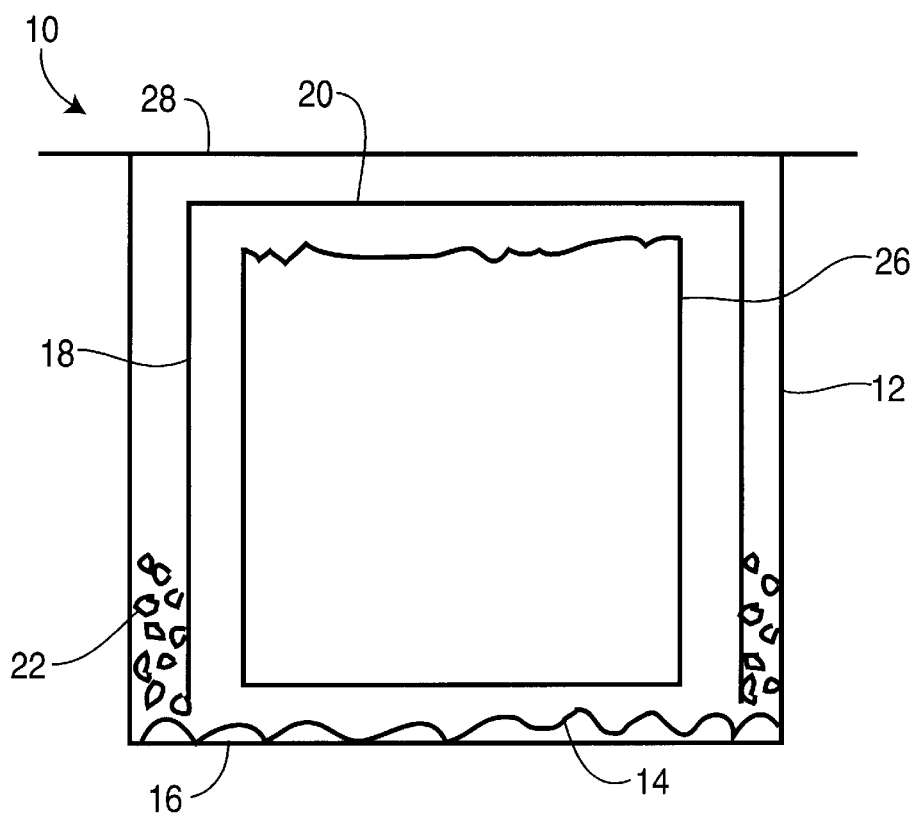
FIGS. 1A and 1B are cross sectional views of apparatus for firing the phosphors of the invention.

The long persistence red and orange emitting phosphors of the invention are selected from the formula SrS:Eu:M.O.X wherein M is a trivalent rare earth that does not change valence in the strontium sulfide host and is selected from the group consisting of praseodymium (Pr), neodymium (Nd), gadolinium (Gd), terbium (Tb), dysprosium (Dy), holmium (Ho), erbium (Er) and lutecium (Lu); and X is a halogen, preferably chlorine or bromine.

The present invention generically includes long persistence phosphors of the formula SrS:Eu:M wherein M is a trivalent rare earth that does not change valence in the strontium sulfide host and is selected from the group consisting of praseodymium (Pr), neodymium (Nd), gadolinium (Gc), terbium (Tb), dysprosium (Dy), holmium (Ho), erbium (Er) and lutecium (Lu). Unlike prior art storage phosphors such as those containing samarium or thulium as coactivators, M of the present invention maintained in a trivalent state operates as a poor trap state thus decreasing the storageability of the phosphor. As a result, the decay rate of phosphorescence is very slow and the phosphor emits in the red to orange-red portion of the visible spectrum. The ability of M to maintain a trivalent oxidation state with a strontium sulfide host is dictated by the ionization potential thereof. Generally, the phosphorescence lifetime of compounds according to the present invention varies from several minutes to beyond several hours. In the presence of coactivators of oxygen (O); and the halogen X, where X is fluorine, chlorine, bromine and combinations thereof including OX, the phosphorescence lifetime is typically enhanced by at least a factor of 2 for a given phosphor composition. An oxygen co-activator is preferably present such that M and oxygen are present in a stoichiometric ratio of between 1:1–3 for M:O. A halogen co-activator is preferably present such that M and X are present in a stoichiometric ratio of between 1:1–4 for M:X. An oxygen-halogen co-activator is preferably present such that M and OX are present in a stoichiometric ratio of between 1:1–4 for M:OX.

Long persistence red and orange emitting phosphors as used herein refer to the spectral emission of phosphor materials which, after excitation with light, emit red or orange-red colored light after the light source is removed.

To make the present phosphors, SrS is doped with divalent europium as the prime activator. The amount of europium (Eu) added can be from about 0.01 to about 2.0 weight percent of the sulfide. Secondary rare earth co-activators, oxygen and halogen can be added in several ways. In a preferred embodiment, initially strontium carbonate is dissolved in nitric acid, forming a solution of strontium nitrate. The corresponding insoluble strontium sulfate ($SrSO_4$) is precipitated with ammonium sulfate or sulfuric acid. The insoluble strontium sulfate is separated from the solution and slurried with nitrate solutions of oxides of europium and one or more trivalen rare earth nitrates ($MNO_3$) that do not change valence in the SrS host, such as erbium nitrate. The rare earth solutions are then dried at 80° C. for about 24 hours. The sulfate ion provides a source of oxygen when making the phosphors of the invention.

The rare earth elements M can be present in amounts of from 0.005 to 5 percent by weight of each element, and is preferably present in amounts of 0.05 to 0.6 percent by weight.

The strontium sulfate including the rare earths is then ground, and oven dried for about 24 hours. It is then ground again, forming strontium sulfate, $SrSO_4$:Eu.M, wherein M is a trivalent rare earth as described above.

In a preferred first firing step, the strontium sulfate is fired to form the corresponding SrS:Eu.M.

The first firing step can best be explained by referring to FIG. 1A, which illustrates a three-vessel apparatus 10 for carrying out the firing. A first, largest vessel 12, is packed with a layer of quartz wool 14 along its bottom surface 16. A second vessel 18 is placed inside the vessel 12 in an inverted position, so that its bottom surface 20 is near the top of vessel 12. A layer of activated charcoal 22 is inserted into the space between vessel 12 and vessel 18. This arrangement ensures that oxygen in the air will not enter the atmosphere of a third vessel 26 in which the reaction will take place. During the firing step, a lid 28 is placed over the opening of vessel 12.

As an example, the ground $SrSO_4$:Eu.M is placed into vessel 26 together with sulfur powder and a hydrocarbon, such as polyethylene. By heating to a temperature of about 900 to 1200° C., the sulfate is converted to the corresponding sulfide, SrS:Eu.M.

The fired material is then ball milled.

Figure 1B:
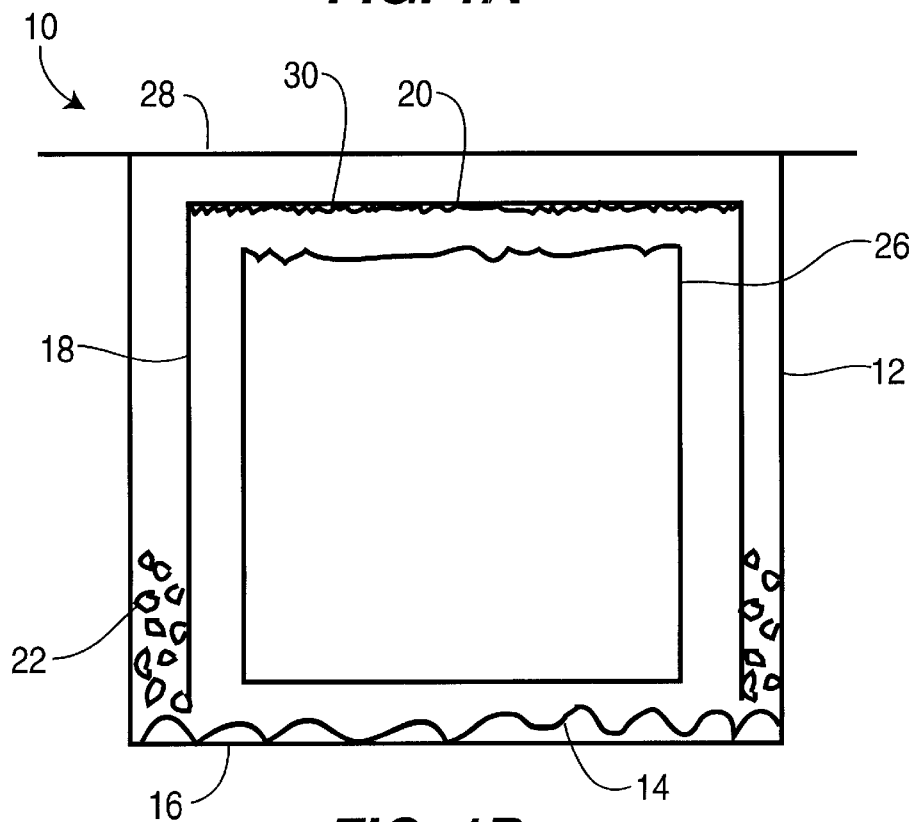

In the second firing step, as illustrated in FIG. 1B, the bottom surface of the second vessel 18 is coated with a molten layer of polyethylene or other hydrocarbon source 30, by melting at a temperature of about 150° C. A halogen compound such as ammonium chloride and a small amount of sulfut are also added to vessel 26, and the mixture is fired at 900 to 1200° C. again.

The presence of the sulfur in the crucible 26 takes up any excess oxygen present; sufficient oxygen was added to the strontium sulfide in the first step, when some oxygen from the sulfate radical is retained in the strontium sulfide product. The polyethylene provides carbon so that the atmosphere in the crucible is $CS_2$. The resultant red-to-orange phosphor is SrS:Eu:M.O.X wherein M is as described above and X is a halogen.

After cooling, a red emitting, long persistence powdered phosphor is obtained that persists for several hours. The particle size of the phosphor powders obtained by heating the phosphor precursor with sulfur in the apparatus 10 of FIG. 1 is about 20 to 40 microns.

In general, the red-to-orange emitting phosphors of the invention emit at about 610 nm. These phosphors will emit when excited by daylight in the red to orange-red color range for at least one hour. Excitation is also obtained by light in the near ultraviolet range, e.g., 365 nm.

The invention will be further described in the following Example, but the invention is not meant to be limited to the details described therein.

EXAMPLE 1

To 3000 ml of distilled water was slowly added an excess of 300 grams of strontium carbonate to form a solution. 250 Ml of nitric acid was added to dissolve the strontium carbonate. An excess of strontium carbonate was added to form a milky solution having a pH of about 5. Magnesium metal pieces cleaned in nitric acid was added to the resultant strontium nitrate solution, which was stirred, heated close to boiling and allowed to cool to room temperature while stirring. The solution of strontium nitrate was filtered.

180 Ml of sulfuric acid was slowly added to 600 ml of water to form a dilute solution, which solution was added to the strontium nitrate solution while stirring rapidly to precipitate strontium sulfate. The mixture was digested for 15 minutes, heated to 60° C., stirred for two hours and cooled.

The liquid was decanted, the precipitate rinsed with water several times, and rinsed with ethanol. The precipitate was dried overnight in an oven at 100° C.

The above $SrSO_4$ (611.1 gm) was mixed with 0.588 grams of europium oxide, 0.639 grams of erbium oxide and 0.62 grams of dysprosium oxide which was previously dissolved in dilute nitric acid, dried at 80° C. and ground. To this product was added 404 grams of sulfur and 83.4 grams of powdered polyethylene.

The base of a large (2400 ml) alumina crucible was packed with quartz wool. A 1000 ml alumina crucible was filled with the above mixture and placed inside the large crucible. A 1500 ml alumina crucible was inverted over the open mixture filled crucible. About 2 inches of charcoal was added and the crucible covered. The whole was fired up to 400° C. for 2 hours, then heated to 1100° C. for one hour and cooled.

The resultant phosphor had a bright orange color.

510 Grams of the above phosphor was then added to an aluminum crucible and 51 grams of sulfur and 0.51 gram of ammonium chloride added. This crucible was heated in a larger crucible as above to 400° C. for two hours, and held at 1100° C. for one hour, and cooled. The resultant phosphor was ground and sieved.

EXAMPLE 2

The process of Example 1 is repeated with the substitution of 1.2 grams of terbium oxide in place of erbium oxide and dysprosium oxide. Following heating to 400° C. in the presence of charcoal and heating at 1100° C. for one hour, a phosphor results having a persistence of greater than 30 minutes. Subsequent firing in the presence of oxygen and a chlorine source compound is omitted.

EXAMPLE 3

The process of Example 2 is repeated with lutecium oxide in place of terbium oxide. A comparable phosphor results.

EXAMPLE 4

The phosphor powder of Example 1 is mechanically mixed to 1% by total weight with a 5% by total weight polymethyl methacrylate having an approximate molecular weight of 10,000. The solution is degassed and spin coated onto a pane glass substrate. The resulting phosphor coated glass pane retains phosphorescence persistence over greater than 500 hours.

Since the phosphors will degrade in the presence of moisture, they must be either preformed and coated with a water-impervious transparent coating, as of a suitable plastic material, or the powder can be mixed with a water-impervious material, such as a paint.

The phosphors of the invention are useful as coatings mixed with various moisture resistant carriers, such as epoxies, polyurethanes, fiberglass, glues and sealants, and the like. The molded materials can be formed into desired shapes, encapsulated in a moisture-resistant carrier or coating and used directly.

Many uses for these phosphors are apparent, including addition to safety signs, door handles, license plates, safety reflectors, night light applications, rails, steps, switch plates, toilet seats and other items in order to obtain visibility in the dark; as well as sporting equipment, such as rackets, balls, nets, hoops, bicycles, golf and baseball clubs; for affixing to clothing so that the wearer is visible in low light; for toys and novelties; and for control buttons or keys for devices such as cellular telephones, beepers, cameras and remote controls for VCRs and television sets. These are examples only and many more uses will be apparent to those skilled in the art.

Although the above phosphors and method of making them have been explained in terms of specific embodiments, variations in the activators, precursor salts, methods of making and the like will be apparent to those skilled in the art and are meant to be included herein. The scope of the invention is only to be limited by the appended claims.

We claim:

1. A long persistence, red-emitting phosphor comprising the formula SrS:Eu:M.O.X wherein M is a trivalent rare earth that does not change valence in the SrS host, and X is a halogen.

2. A phosphor according to claim 1 wherein X is chlorine.

3. A phosphor according to claim 1 wherein X is bromine.

4. A phosphor according to claim 1 wherein M is a trivalent rare earth that does not change valence in the SrS host that is selected from the group consisting of praseodymium, neodymium, gadolinium, terbium, dysprosium, holmium, erbium and lutetium.

5. A phosphor according to claim 4 wherein the trivalent rare earth is erbium.

6. A phosphor according to claim 1 encapsulated in a water-impervious coating.

7. A phosphor according to claim 1 produced in powdered form wherein the powder particles are encapsulated in a water impervious coating.

8. A method of making a phosphor having the formula SrS:Eu:M.O.X wherein M is a trivalent rare earth that does not change valence in the SrS host and X is a halogen comprising a) mixing strontium sulfate doped with europium and one or more trivalent rare earths that does not change valence in a SrS host with a hydrocarbon and sulfur in a closed inert crucible;

b) heating the mixture at about 900 to 1200° C. and c) heating the product with sulfur, a hydrocarbon and an ammonium halide to form SrS:Eu:M.O.X wherein M and X have the meanings given above.

9. A method according to claim 8 wherein the halogen is chlorine.

10. A method according to claim 8 wherein M is a trivalent rare earth selected from the group consisting of praseodymium, neodymium, gadolinium, terbium, holmium, erbium and lutetium.

11. A method according to claim 8 wherein the trivalent rare earth is terbium.

12. A phosphor comprising a long persistence, red-emitting strontium sulfide doped with europium and a coactivator M where M is a rare earth ion selected from the group consisting of: praseodymium, neodymium, gadolinium, terbium, dysprosium, holmium, erbium and lutetium.

13. The phosphor of claim 12 further comprising OX where X is a halogen.

14. The phosphor of claim 13 wherein M and OX are present in a stoichiometric ratio of between 1:1–4 for M:OX.

15. The phosphor of claim 13 where X is selected from the group consisting of: chlorine and bromine.

16. The phosphor of claim 12 wherein M is praseodymium.

17. The phosphor of claim 12 wherein M is neodymium.

18. The phosphor of claim 12 wherein M is gadolinium.

19. The phosphor of claim 12 wherein M is terbium.

20. The phosphor of claim 12 wherein M is dysprosium.

21. The phosphor of claim 12 wherein M is holmium.

22. The phosphor of claim 12 wherein M is erbium.

23. The phosphor of claim 12 wherein M is lutetium.

24. The phosphor according to claim 12 further comprising a water impervious coating.

25. The phosphor according to claim 12 wherein red to orange-red colored light is emitted after a light source is removed.

26. The phosphor according to claim 12 further comprising oxygen.

27. The phosphor according to claim 26 wherein M and oxygen (O) are present in a stoichiometric ratio of between 1:1–3 for M:O.

28. The phosphor according to claim 12 further comprising halogen.

29. The phosphor according to claim 28 wherein M and halogen (X) are present in a stoichiometric ratio of between 1:1–4 for M:X.

* * * * *